United States Patent Office.

RICHARD BOWDEN WATERS, OF LONDON, ENGLAND.

RIVET.

SPECIFICATION forming part of Letters Patent No. 555,137, dated February 25, 1896.

Application filed July 8, 1895. Serial No. 555,290. (No model.)

*To all whom it may concern:*

Be it known that I, RICHARD BOWDEN WATERS, blacksmith, a subject of the Queen of Great Britain and Ireland, and a resident of 28 Hanlon Street, Deptford, in the city of London, England, have invented certain new and useful Improvements in Rivets for Joining Metal Plates and the Like Together, of which the following is a specification.

The usual method of riveting metal plates and the like together is by the use of iron rivets which are first made red-hot and after being inserted into holes formed for their reception in the plate are clinched and finally finished with a snapping-tool.

In many instances where iron or soft-steel plates of between ten and eighteen gage or thereabout in thickness are used—say, in the construction of tanks, gas-holders, low-pressure boilers, water-pipes, and the like—it frequently happens that owing to the weakness of the material the plates are caused to buckle or bulge through the heat from the rivets. Consequently an imperfect joint is made. Moreover, as it is necessary to clinch and finish the rivet while it is red-hot in order to make a perfect joint, it sometimes occurs that through the difficulty in placing the rivet in position it gets nearly cold and therefore cannot be rigidly secured. There are also many other well-known disadvantages attending the use of these rivets, more especially in connection with this class of work. Now my invention is designed to overcome these disadvantages and provide a simple and inexpensive form of rivet whereby metal plates and the like can be quickly and effectually joined together without the necessity of first making the rivets red-hot, as hitherto; but in order that the invention may be clearly understood I will refer to the accompanying sheet of drawings.

Figure 1 illustrates a headed stem and washer detached. Fig. 2 shows the washer in position upon a headed stem before clinching. Fig. 3 shows the washer and headed stem clinched. Fig. 4 represents a rose-headed stem and flat washer clinched. Fig. 5 illustrates a contrivance for holding the washer in position upon the stem during clinching.

In carrying out the invention the bolt or stem A is inserted in the hole or perforation made in both pieces of metal to receive it. An iron dolly or other similar tool is then held against the fixed head B, while the washer-head C is placed upon the projecting or stub end of said bolt or stem, which is finally swaged, so as to firmly secure the washer-head C to the stem A, and thus form a simple and at the same time rigid joint.

The construction of the rivet is such that the under portion of the washer-head is slightly cupped or concaved, so that the outer edge will bind firmly upon the plate in such a manner as to adapt itself to any irregularities on said plate, so as to prevent leakage through the washer-head; further, the stub end of the stem is slightly recessed or hollowed, so that it will more easily spread when swaged and rigidly secure the washer-head in position. A countersink is formed in the upper portion of said washer-head to receive that portion of the stem which has been spread out, so that when complete said washer-head will resemble an ordinary snapped rivet.

The most convenient method of retaining the washer-head upon the bolt or stem during the process of swaging or clinching is by the use of a tool similar to that shown in Fig. 5, which is made to fit over the washer-head, so as to bind upon the rim portion only.

It will thus be seen that by the use of cold-iron or soft-steel rivets, which are much less expensive and more convenient to manipulate than ordinary rivets which require to be made red-hot and the head formed solid with the stem, I can obtain better results, more especially in the construction of that class of work where thin gage-iron or soft steel is used and to which my invention more particularly relates.

As an alternative method in the use of my invention I may make the washer-head C red-hot and place it in position upon the stem A, so that when cold it will shrink and become firmly secured to said stem, which can be afterward swaged or riveted, if necessary.

Having now described my invention, what I claim as new, and desire to secure by Letters Patent, is—

A rivet consisting of the headed stem A having a concave end in combination with the washer C, cup-shaped on one side and countersunk on the other.

In witness whereof I have hereunto set my hand in the presence of two witnesses.

RICHARD BOWDEN WATERS.

Witnesses:
 GEORGE PERCY SKELSEY,
 HAROLD MAXIMILIAN SEARE.